Figure 5:
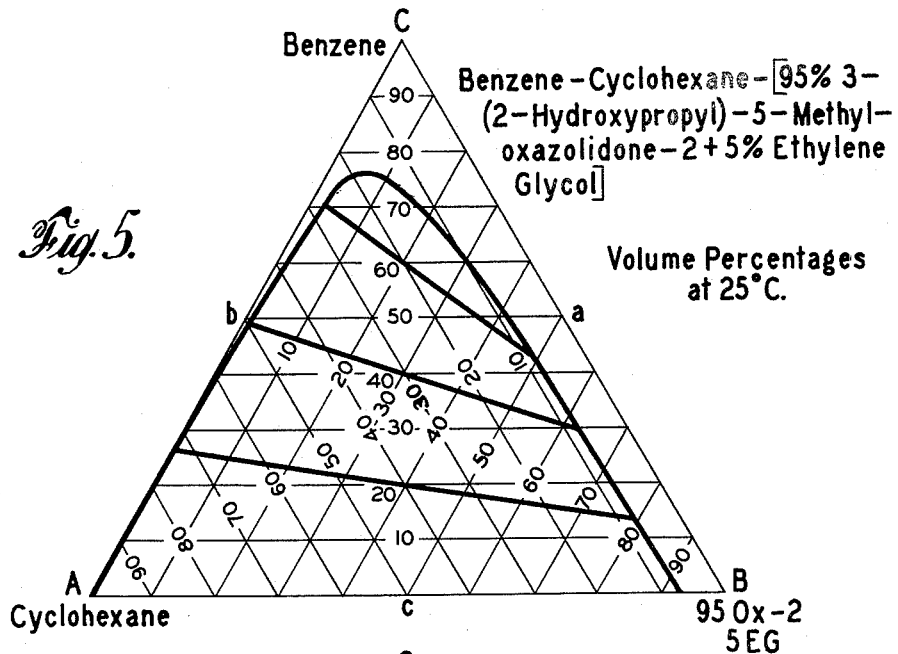

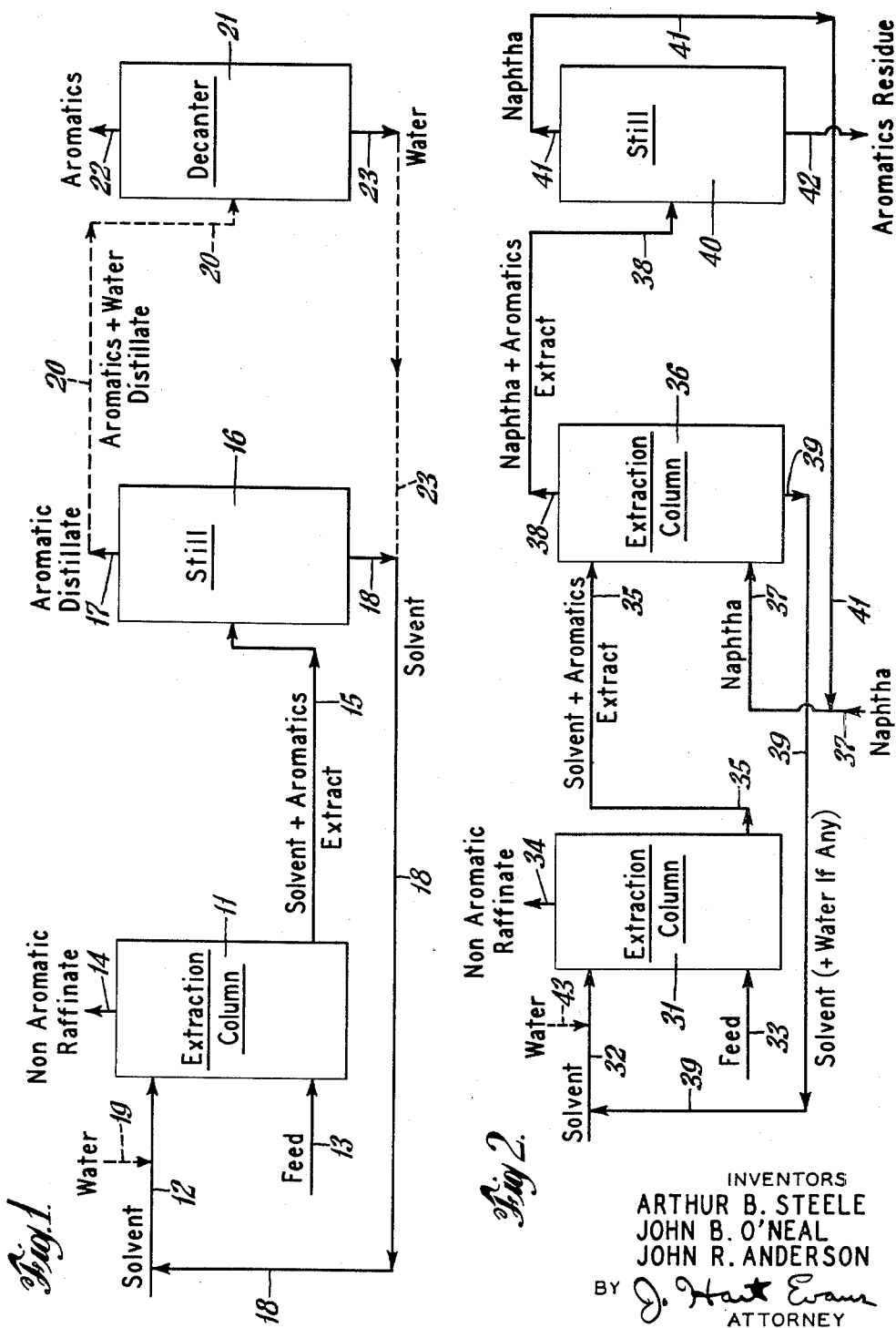

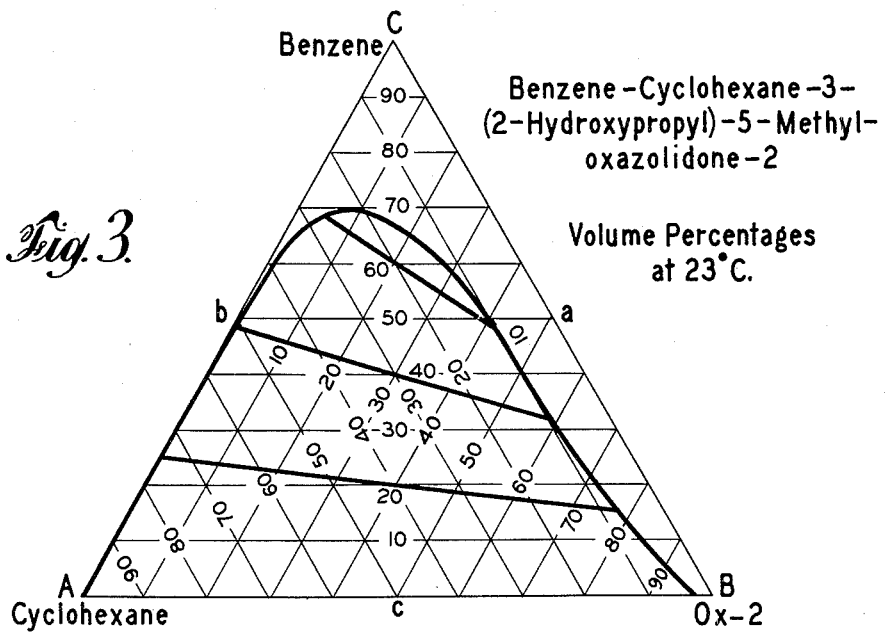
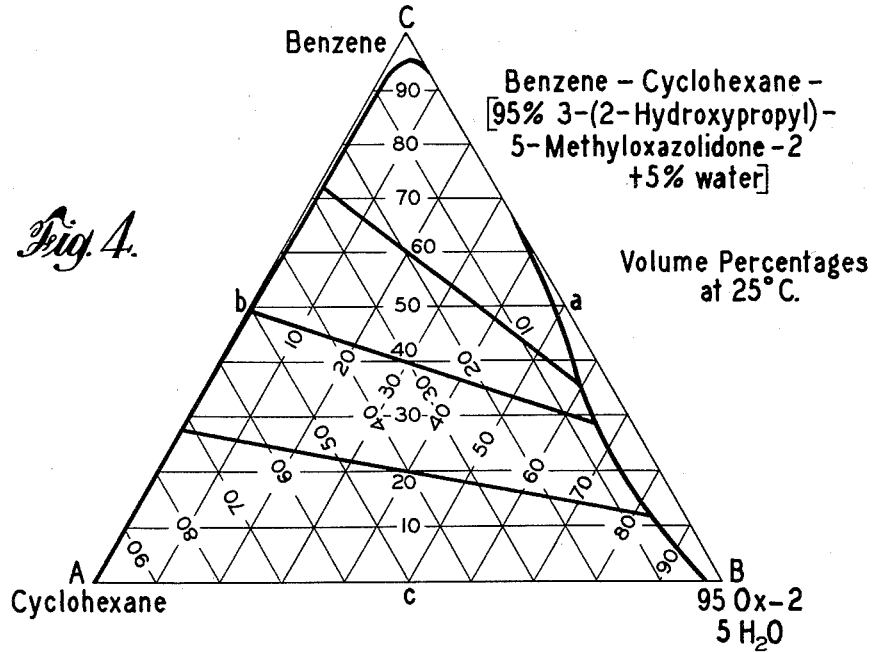

April 12, 1960    A. B. STEELE ET AL    2,932,675
SOLVENT EXTRACTION USING SUBSTITUTED OXAZOLIDONES
Filed Dec. 28, 1955    4 Sheets-Sheet 4

INVENTORS
ARTHUR B. STEELE
JOHN B. O'NEAL
JOHN R. ANDERSON
BY J. Hart Evans
ATTORNEY

United States Patent Office 2,932,675
Patented Apr. 12, 1960

2,932,675
SOLVENT EXTRACTION USING SUBSTITUTED OXAZOLIDONES

Arthur B. Steele, Ossining, N.Y., and John B. O'Neal and John R. Anderson, Pittsburgh, Pa., assignors to Union Carbide Corporation, a corporation of New York Application December 28, 1955, Serial No. 555,874

20 Claims. (Cl. 260—674)

The invention relates to the separation of aromatic hydrocarbons from non-aromatic hydrocarbons and more particularly to the use of substituted oxazolidones as selective solvents for this separation. We have found certain substituted oxazolidones have superior solvent properties. These compounds can be represented graphically by the general formula:

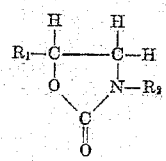

where $R_1$ is an alkyl group and $R_2$ is a monohydroxy alkyl group with the total number of carbon atoms in $R_1$ and $R_2$ not greater than 6. Typical of these compounds are 3-(2-hydroxyethyl)-5-methyloxazolidone-2, of the formula:

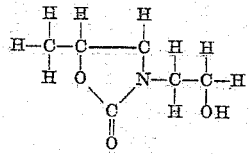

and 3-(2-hydroxypropyl)-5 methyloxazolidone-2 of the formula:

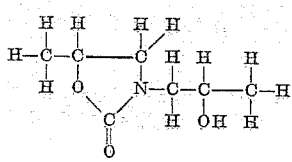

Numerous solvents have been proposed for the separation of aromatic from non-aromatic hydrocarbons, including ethylene carbonate, propylene carbonate, diethylene glycol and dipropylene glycol. While the separation of aromatic hydrocarbons from non-aromatic hydrocarbons can be accomplished by the use of such solvents, in many instances they have the disadvantage of being unstable in water, being difficult to remove from the compounds being separated because of the closeness of their boiling points, their having insufficient capacity for aromatic hydrocarbons at operable temperatures, or for other reasons.

The present improvement is based upon our discovery that the separation of aromatic hydrocarbons from non-aromatic hydrocarbons can be performed with substituted oxazolidones described above, more advantageously than with the solvents heretofore employed, as will be seen. It is an object of the invention therefore to provide a process for separating hydrocarbon mixtures into fractions which differ in their degrees of aromaticity, that is, into more aromatic and less aromatic fractions. A further object is to separate hydrocarbon mixtures into a multiplicity of fractions having different properties. Yet another object of the invention is to separate an aromatic hydrocarbon in pure form or nearly so from admixture with other hydrocarbons.

The invention can be applied to any mixture of aromatic and non-aromatic hydrocarbons, such as petroleum fractions, coal hydrogenation products and similar mixtures. It may also be used to separate more aromatic hydrocarbons from less aromatic hydrocarbons by appropriate choice of temperature and pressure conditions.

In carrying out our process, the substituted oxazolidone, with or without a diluent or cosolvent, is added to such a mixture. Two phases are formed, of which one is an extract phase comprising the substituted oxazolidone and the more aromatic hydrocarbons and the other is a raffinate phase comprising aliphatic or less aromatic hydrocarbons. The solvent is then removed from the more aromatic hydrocarbon extract by appropriate means.

The invention may be more fully understood from the drawing. Figures 1 and 2 are schematic diagrams of typical separation procedures employing solvents of the invention. Figure 1 illustrates a cyclic process wherein the solvent is separated from the aromatic fraction by distillation. In Figure 1 solvent enters the extraction column 11 through line 12 and the mixture to be extracted enters column 11 through line 13. After the extraction the non-aromatic or less aromatic raffinate is removed as a product through line 14. The mixture of solvent and aromatic hydrocarbons is removed from extraction column 11 through line 15 and led into the still 16. As the distillation proceeds the distillate of aromatic hydrocarbons is removed from still 16 through line 17 as another product. The solvent residue, is removed through line 18 and recycled in line 18 to the solvent line 12 for reuse in extraction column 11. The cycle is thus complete if the solvent is not diluted with water.

If water is mixed with the solvent the process in Figure 1 is modified as follows. Water is added to the solvent through line 19. The process is then the same up to the still 16. The aromatic distillate removed through line 17 will now contain water and is led through line 20 to the decanter 21. After the water is separated in the decanter 21 the aromatic fraction is removed as product through line 22. The water is removed from the decanter 21 through line 23 and is conducted through line 23 to line 18 where it is reunited with the recovered solvent for recycle to the solvent line 12 for reuse in the extraction of column 11.

In Figure 2 is shown a cyclic process wherein the solvent is removed from the aromatic extract by backwashing with a naphtha. In Figure 2 solvent enters the first extraction column 31 through line 32 and the mixture to be extracted enters column 31 through line 33. After the extraction the non-aromatic or less aromatic raffinate is removed as product through line 34. The mixture of solvent and aromatic hydrocarbons is removed from the first extraction column 31 through line 35 and led into the second extraction column 36. A naphtha back extractant is fed into column 36 through line 37 to extract the aromatics from the solvent. An extract mixture of naphtha and aromatic hydrocarbons is removed from the second extraction column 36 through line 38 and is conducted through line 38 to a still 40 for separation of the naphtha from the aromatic hydrocarbons. The solvent which is left is removed through line 39 and recycled through line 39 to the solvent line 32 for reuse in the first extraction column 31. As the distillation proceeds the naphtha distillate is removed from the still 40 through line 41 and recycled in line 41 to the naphtha line 37 for reuse in the second extraction column 36. The residue of aromatics is removed from the still 40 through line 42 as product. The above procedure is employed whether the solvent is used alone or with water as a diluent.

If water is employed as a diluent in the process as shown in Figure 2 the water is added to the solvent through line 43. The water remains with the solvent throughout the process, being separated with the solvent in the back extraction in column 36 and recycled with the solvent for reuse in column 31.

Figure 6:
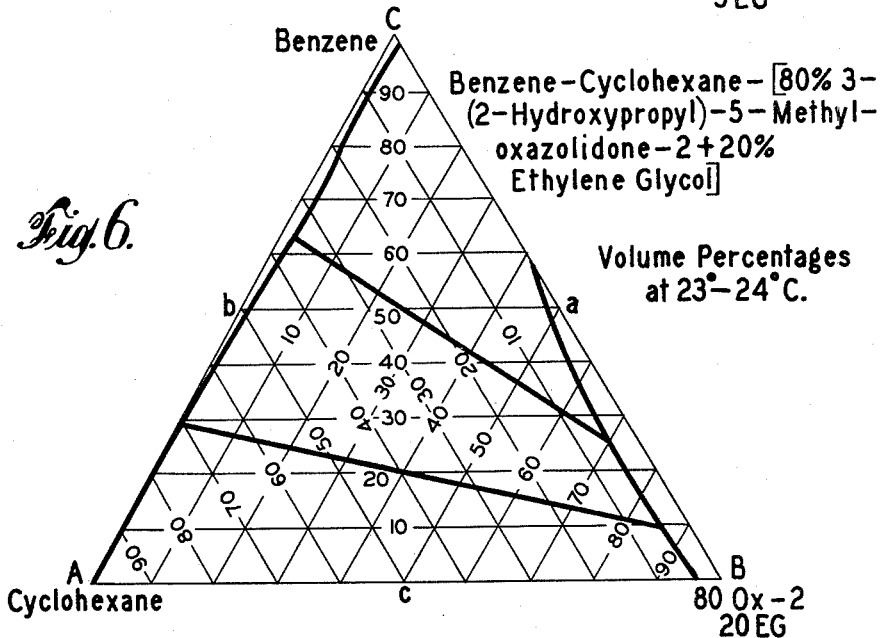
Figure 7:
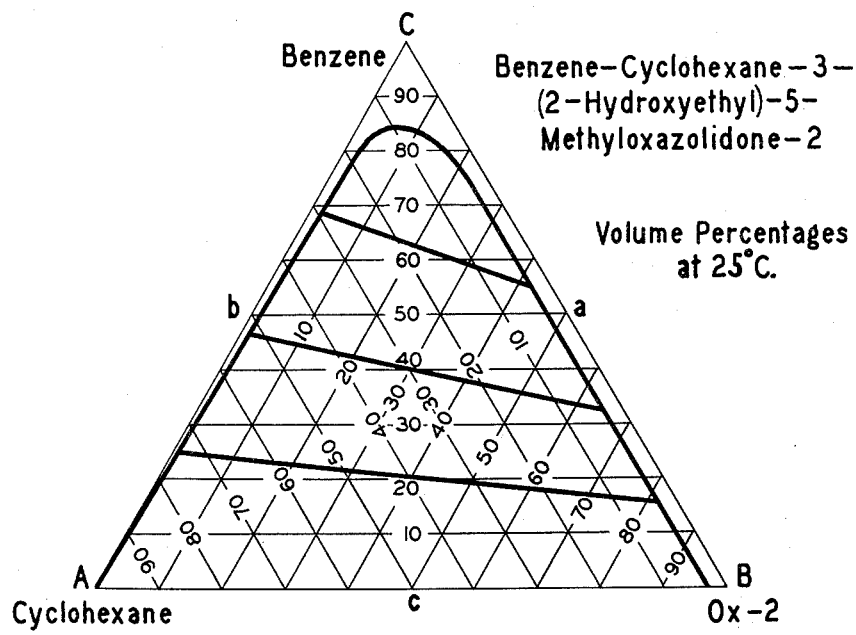

Figures 3, 4, 5, 6 and 7 of the drawing are ternary miscibility diagrams for the solvents of the invention, illustrating their use in separating typical hydrocarbon mixtures. Representative tie lines are shown on all diagrams. Figure 3 illustrates the system comprising benzene, cyclohexane and 3-(2-hydroxypropyl)-5-methyloxazolidone-2. Figure 4 shows benzene, cyclohexane and a mixture of 95 percent 3-(2-hydroxypropyl)-5-methyloxazolidone-2 and 5 percent water, while Figure 5 shows benzene, cyclohexane and a mixture of 95 percnet 3-(2-hydroxypropyl)-5-methyloxazolidone-2 and 5 percent ethylene glycol. In Figure 6 is represented the behavior of the system benzene, cyclohexane and a mixture of 80 percent 3-(2-hydroxypropyl)-5-methyloxazolidone-2 and 20 percent ethylene glycol. The last figure, Figure 7 shows the system consisting of benzene, cyclohexane and 3-(2-hydroxyethyl)-5-methyloxazolidone-2.

The ternary miscibility diagrams illustrate the invention with different solvents employed to separate benzene from cyclohexane. The diagrams were prepared in the following manner. Various mixtures of benzene and cyclohexane were shaken in a flask together with such volumes of the various solvents that the volumes of solvent and of cyclohexane, both measured at the temperature of the experiment, were approximately equal. The two phases were then allowed to settle and form layers and were separated. The solvent was removed from the raffinate phase by water extraction, and the resulting hydrocarbon mixture was analyzed. A ternary miscibility diagram for the benzene-cyclohexane-solvent system was determined by titration. The compositions of the various components in the raffinates were then ascertained by graphical methods, wherein the raffinate composition point was determined on the appropriate miscibility graph as the point where a straight line projected from the point representing the composition of the recovered hydrocarbon mixture, and extending to the solvent corner of the diagram, crossed the left raffinate limb of the miscibility curve, in each of Figures 3, 4, 5, 6 and 7.

Finally, tie-lines were established by projecting a straight line from these aforementioned raffinate composition points to the opposite sides of the miscibility curves, such straight lines passing through the points representing the ternary compositions of the mixtures of aromatic hydrocarbons, non-aromatic hydrocarbons and solvents which were mixed together at the beginning of the experiment. These ternary miscibility diagrams, with the tie-lines therein, demonstrate the utility of different solvents of the invention, including diluted solvents, for the separation of aromatic hydrocarbons from non-aromatic hydrocarbons. Mixtures of benzene and cyclohexane have been used to illustrate the invention, but the process is applicable generally to separation of aromatic hydrocarbons from non-aromatic hydrocarbons and is in no sense limited to the benzene-cyclohexane system with which it is illustrated by way of example.

The solvent employed may be one or more of several oxazolidones, either alone or mixed with diluents or co-solvents such as water and ethylene glycol. Thus a solvent might consist of an oxazolidone alone, or mixed with water or ethylene glycol or both. As a matter of convenience, the invention is described below with reference to a specific solvent, namely 3-(2-hydroxypropyl)-5-methyloxazolidone-2, which is a preferred solvent in the invention.

There are a number of advantages to the use of the substituted oxazolidones of the invention as solvents, some of which will become apparent, and some of which will be pointed out more specifically hereafter in considering the properties of the compounds. The compounds of the invention have been found to be extremely stable to heat and to hydrolytic decomposition, a property not characteristic of many of the solvents commonly used for the separation of aromatics. The thermal stability of the solvents of the invention permits operating our extraction process at elevated temperatures. This is an important advantage because the critical solution temperatures of the alkyl benzene hydrocarbons in solvents increase, and consequently the solubility of these hydrocarbons at a given temperature decrease, as a function of the number of paraffinic carbon atoms in the side chains of the hydrocarbons. Inasmuch as operation at elevated temperatures is possible with the solvents of the invention, any desired solubility of the aromatic hydrocarbon, including complete miscibility if desired, may be achieved by operation at selected elevated temperatuers. By way of illustration, the selective solvent 3-(2-hydroxypropyl)-5-methyloxazolidone-2 is miscible, at a temperature of 160° C. with benzene hydrocarbons having as many as 6 alkyl carbon atoms. This temperature, or a higher one, can readily be employed as the operating temperature for the process of our invention. This contrasts with the use of such solvents as ethylene carbonate, which is not completely miscible with diethyl benzene, with or without water present, at temperatures below 100° C. and which begins to decompose at the temperatures at which it is completely miscible with diethyl benzene, particularly if a trace of water is present.

The thermal stability of the substituted oxazolidones permits separating the solvent from the aromatic which it has separated by simple distillation as shown in Figure 1 of the drawing without degrading or contamination of the solvent. Thus in our process it is not essential to use complicated separation procedures to remove the solvent from the extract, as is required with solvents which tend to decompose upon being distilled.

Because our solvents are highly stable to hydrolysis, and because they are completely miscible with polar solvents, including water, they may be diluted to any desired degree with polar solvents such as water or ethylene glycol. In this way the solubility of the aromatic hydrocarbon in the solvent, and consequently the purity of the hydrocarbon that may be obtained, can be controlled to any desired degree as can be seen in Figures 3, 4, 5 and 6 of the drawing.

In the sense that a "strong" solvent for aromatic hydrocarbons becomes completely miscible with an alkyl aromatic hydrocarbon at a lower temperature than does a "weak" solvent, the solvents of the invention are much stronger than ethylene glycol and diethylene glycol, somewhat stronger than triethylene glycol and slightly stronger than ethylene carbonate. The solvents therefore have high capacity for the lower alkyl-substituted aromatic hydrocarbons at reasonably low temperatures.

Because of their high strength the solvents of the invention are preferably not used alone at room temperatures for separating lower aromatics such as benzene and toluene from admixtures with non-aromatic hydrocarbons. As can be seen from Figure 3 of the drawing, 3-(2-hydroxypropyl)-5-methyloxazolidone-2 used alone gives a maximum purity for benzene of 83 percent by volume. For toluene the percentage is somewhat greater than 90 percent while for xylene, ethylbenzene and the more highly alkylated benzene hydrocarbons the separation can be complete, giving an extract free of non-aromatic hydrocarbons. Complete separation of benzene and toluene at room temperatures can be achieved, however, by dilution of the solvent with a small amount of water or ethylene glycol, as shown in Figures 4 and 6 of the drawing with particular reference to benzene.

When employing the solvents of the invention at or near room temperature it is desirable to use a diluent such as water or ethylene glycol because of the high viscosity of the solvents of the invention at room temperatures. For example, 3-(2-hydroxypropyl)-5-methyloxazolidone-2 has a viscosity of 110 centipoises at a temperature of 98.8° F., compared to only 5 centipoises at a temperature of 210° F.

The diluents employed are of course not completely miscible with aromatic or non-aromatic hydrocarbons. As stated earlier, suitable diluents include such polar solvents as water and ethylene glycol. The degree of dilution will depend upon a number of factors including the particular solvent employed, the operating temperature and the particular aromatic compound to be extracted. In general, water may be added in an amount of from 1 to 25 percent by volume of the solvent. For most cases about 5 percent will be preferred. For ethylene glycol the preferred amount will usually be about 20 percent by volume of the solvent, while from 1 to 50 percent may be advantageously employed. A comparison of Figures 3, 4, 5 and 6 of the drawing shows that for the separation of benzene from cyclohexane by the use of 3-(2-hydroxypropyl)-5-methyloxazolidone-2 about 5 percent by volume of water or about 20 percent of ethylene glycol is preferred.

The operating temperature for a particular extraction will be determined by the materials being separated, the particular solvent being employed and the degree of dilution of the solvent, if any, as well as the viscosity of the solvent. The critical solution temperature in the particular solvent of the aromatic to be separated is an excellent guide to the optimum operating temperature. Preferably, the operating temperature for the extraction process will usually be just below the critical solution temperature when using undiluted solvent and slightly above when using diluted or modified solvent. The critical solution temperature, which may be defined as the temperature below which the solution separates into two phases, may be readily determined for the components of any particular separation. For example the critical solution temperature for 3-(2-hydroxypropyl)-5-methyloxazolidone-2 and xylene is 75° C. while with the same solvent and triethylbenzene it is approximately 160° C. For most separations the operating temperature will be at least 80° C. and not more than 250° C. and atmospheric pressure will be satisfactory. With more highly alkylated aromatic hydrocarbons the temperature may be even higher and for these higher temperatures super atmospheric pressure may be employed if desired.

For most separations the removal of the solvent from the extract mixture to leave the aromatic hydrocarbons as product may be accomplished by distillation as shown in Figure 1. If desired, however, distillation may be avoided and the solvent removed by back-extraction with a naphtha, as illustrated in Figure 2. The naphtha chosen should have a boiling point range substantially above or below, preferably above, the boiling point range for the aromatic fraction being separated, in order that the naphtha may be readily separated by distillation from the aromatic fraction after the back-extraction. The naphtha may be a single compound or a mixture such as a kerosene having an appropriate boiling point range.

As can be seen from Figure 3 of the drawing, the solubility of the solvent in non-aromatic hydrocarbons is extremely low, and consequently very little solvent need be recovered from the raffinate. Because of this fact, and the stability of the solvents to hydrolysis, water-washing may be employed to recover the solvent from the raffinate, a preferred recovery method.

What is claimed is:

1. A process for separating a hydrocarbon mixture into a more aromatic and a less aromatic fraction which comprises extracting the more aromatic fraction from the mixture with a solvent comprising a substituted oxazolidone having the formula:

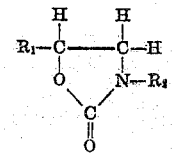

wherein $R_1$ is an alkyl group and $R_2$ is an alkanol group, the total number of carbon atoms in $R_1$ and $R_2$ is not less than 2 and not more than 6, and $R_2$ contains only one hydroxyl group.

2. A process according to claim 1 wherein a diluent is used in combination with the solvent.

3. A process according to claim 1 wherein water is used as a diluent in combination with the solvent.

4. A process according to claim 1 wherein ethylene glycol is used as a diluent in combination with the solvent.

5. A process according to claim 1 wherein the solvent comprises 3-(2-hydroxyethyl)-5-methyloxazolidone-2.

6. A process according to claim 1 wherein the solvent comprises 3-(2-hydroxyethyl)-5-methyloxazolidone-2 and a diluent.

7. A process according to claim 1 wherein the solvent comprises 3-(2-hydroxyethyl)-5-methyloxazolidone-2 and water.

8. A process according to claim 1 wherein the solvent comprises 3-(2-hydroxyethyl)-5-methyloxazolidone-2 and ethylene glycol.

9. A process according to claim 1 wherein the solvent comprises 3-(2-hydroxypropyl)-5-methyloxazolidone-2.

10. A process according to claim 1 wherein the solvent comprises 3-(2-hydroxypropyl)-5-methyloxazolidone-2 and a diluent.

11. A process according to claim 1 wherein the solvent comprises 3-(2-hydroxypropyl)-5-methyloxazolidone-2 and water.

12. A process according to claim 1 wherein the solvent comprises 3-(2-hydroxypropyl)-5-methyloxazolidone-2 and ethylene glycol.

13. A process for separating a hydrocarbon mixture into a substantially aromatic fraction and a substantially non-aromatic fraction which comprises extracting a substantially aromatic fraction from the mixture with a solvent comprising a substituted oxazolidone having the formula:

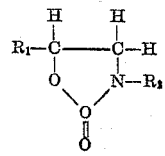

wherein $R_1$ is an alkyl group and $R_2$ is an alkanol group, the total number of carbon atoms in $R_1$ and $R_2$ is not less than 2 and not more than 6, and $R_2$ contains only one hydroxyl group.

14. A process according to claim 13 wherein a diluent is used in combination with the solvent.

15. A process according to claim 13 wherein water is used as a diluent in combination with the solvent.

16. A process according to claim 13 wherein ethylene glycol is used as a diluent in combination with the solvent.

17. A process according to claim 13 wherein the solvent comprises 3-(2-hydroxyethyl)-5-methyloxazolidone-2.

18. A process according to claim 13 wherein the solvent comprises 3-(2-hydroxyethyl)-5-methyloxazolidone-2 and a diluent.

19. A process according to claim 13 wherein the solvent comprises 3-(2-hydroxypropyl)-5-methyloxazolidone-2.

20. A process according to claim 13 wherein the solvent comprises 3-(2-hydroxypropyl)-5-methyloxazolidone-2 and a diluent.

References Cited in the file of this patent

UNITED STATES PATENTS

| | | |
|---|---|---|
| 2,092,739 | Van Dijck | Sept. 7, 1937 |
| 2,357,667 | Kuhn | Sept. 5, 1944 |
| 2,409,059 | Montgomery et al. | Oct. 8, 1946 |
| 2,656,328 | Caldwell | Oct. 20, 1953 |
| 2,688,645 | Badertscher et al. | Sept. 7, 1954 |
| 2,840,511 | Rylander et al. | June 24, 1958 |
| 2,868,801 | Steele | Jan. 13, 1959 |